United States Patent [19]
Sato

[11] 3,752,046
[45] Aug. 14, 1973

[54] PHOTOGRAPHIC CAMERA HAVING A FLASH SYNCHRONIZING DEVICE

[75] Inventor: Masanobu Sato, Tokyo, Japan

[73] Assignee: Olympus Optical Co., Ltd., Tokyo, Japan

[22] Filed: Sept. 1, 1971

[21] Appl. No.: 176,910

[30] Foreign Application Priority Data
Sept. 7, 1970   Japan.............................. 45/89030
Sept. 8, 1970   Japan.............................. 45/89255
Nov. 24, 1970   Japan.............................. 45/116564

[52] U.S. Cl. ........................... 95/11.5 R, 95/11 R
[51] Int. Cl. ....................... G03b 15/03, G03b 9/70
[58] Field of Search .............. 95/11 R, 11 L, 11.5 R; 240/1.3; 339/48, 61, 88, 90

[56] References Cited
UNITED STATES PATENTS
3,463,069   8/1969   Kremp et al. ..................... 240/1.3 X
2,643,597   6/1953   Suzukawa ......................... 95/11.5 R
3,633,476   1/1972   Yazaki et al. ..................... 95/11.5 R

*Primary Examiner*—Robert P. Greiner
*Attorney*—Kelman & Berman

[57] ABSTRACT

Photographic camera having a flash synchronizing device operable in X-contact and M-contact synchronization photography. The camera has a pair of electric terminals each connected to the X-contacts and the M-contacts of the flash synchronizing device. The pair of electric terminals are embedded in the accessory shoe of the camera spaced apart from each other in such positions that, when an electronic flash device having an electric contact thereof in its mounting foot is attached to the accessory shoe, the terminal for the X-contacts of the camera contacts with the electric contact of the flash device so as to be operable in X-contact synchronization photography, while, when a flash bulb device is attached with its mounting foot to the accessory shoe, the electric contact provided in the foot contacts with the electric terminal for the M-contacts of the camera so as to be operable in M-contact synchronization photography. Alternatively, the flash bulb device is provided with a movable member adapted to be moved each time a flash bulb is loaded in the flash device so that the movable member cooperates with actuating means in the camera, when the flash device is attached to the camera, for switching a switch of the flash synchronizing device normally connecting X-contacts in the circuit so as to connect the M-contacts in the circuit each time a flash bulb is loaded in the flash bulb device. Two sets of guide number setting resistors are selectively connected across the galvanometer of an automatic exposure control device of the camera having a programming shutter and a flash synchronizing device operable in X-contact and M-contact synchronization photography. One set of the resistors is for the X-contact synchronization while another set is for the M-contact synchronization, and the resistance each of the resistors for the M-contact synchronization is selected to be different from that of the respective resistor for the X-contact synchronization so that the exposure light is compensated for to achieve the proper exposure in the M-contact synchronization in which otherwise underexposure takes place.

4 Claims, 13 Drawing Figures

Patented Aug. 14, 1973

INVENTOR.
Masanobu Sato
BY
Kelman and Berman,
AGENTS

Fig_10
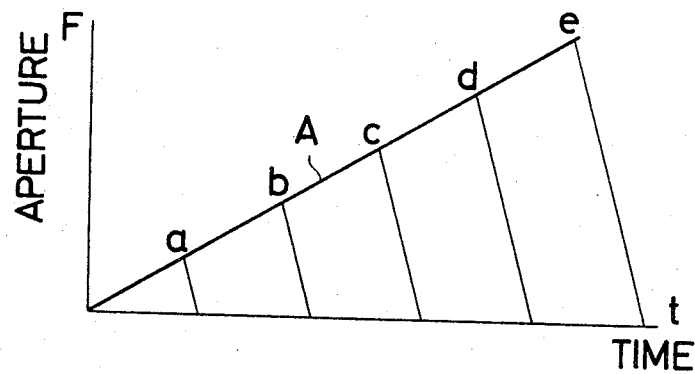
Fig_11
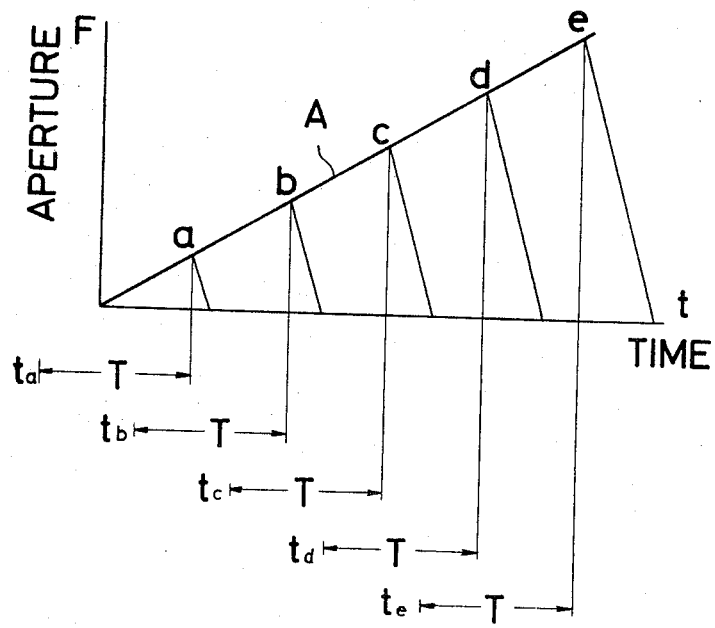

INVENTOR.
Masanobu Sato
BY
Kelman and Berman
AGENTS

PHOTOGRAPHIC CAMERA HAVING A FLASH SYNCHRONIZING DEVICE

BACKGROUND OF THE INVENTION

The present invention relates to a photographic camera having a flash synchronizing device, and more particularly to a photographic camera, in which the flash synchronizing device is automatically switched for X-contact or M-contact synchronization by attaching an electronic flash device or a flash bulb device.

The present invention also relates to a flash bulb device for use with a photographic camera having a flash synchronizing device provided with X-contacts for an electronic flash device and M-contacts for a flash bulb device, wherein the flash synchronizing device is automatically switched to M-contacts each time a flash bulb is loaded in the flash bulb device mounted on the camera.

The present invention further relates to a compensating device for the exposure light quantity in a photographic camera having an automatic exposure control device and a flash synchronizing device, in which the exposure light quantity in a flash photography by using a flash device is automatically regulated in response to the adjustment of the camera for varying the distance between an object and the camera for the proper exposure.

In a flash photography, two types of flash devices have been utilized, one of which is a flash bulb type while the other is an electronic flash device. When a flash bulb device is used with a camera having a flash synchronizing device for the flash photography, the flash synchronizing device must be switched to M-contacts which are closed for energizing the flash bulb shortly before the shutter blades of the camera have been fully opened to achieve a predetermine aperture so that the peak of light quantity emanating from the flash bulb occurring shortly after the energization of the flash bulb synchronizes with the fully opened shutter blades.

On the other hand, when an electronic flash device is used, the flash synchronizing device must be switched to X-contacts which are closed at the time the shutter blades have been fully opened so that the light of the electronic flash device emanating instantaneously with the energization thereof is synchronized with the fully opened shutter blades.

Heretofore, the switching of the synchronizing contacts have been effected manually by operating a switch provided in the lens barrel of the camera which is provided with an accessory shoe having electric contacts through which the flash synchronizing device of the camera is automatically brought to be operative when the flash device is mounted on the accessory shoe, or manually selecting sockets for M-contacts and X-contacts provided in the camera which is provided with an accessory shoe having no electric contacts for connecting the flash device to the camera. The manual operation of the switch or the selection of the sockets must be effected each time the flash device is changed from a flash bulb device to an electronic flash device or vice versa, thereby making the manipulation of the camera very troublesome while a faulty operation of the camera might be effected to cause a failure in a flash photography.

In carrying out a flash photography by using a photographic camera having an automatic exposure control device which includes a galvanometer, a photoelectric element and an electric source, a programming shutter and a flash synchronizing device including synchronizing contacts, a variable resistor selectively connected to the terminals of the photoelectric element and coupled with a distance setting means in the camera for varying the resistance thereof in response to the adjustment of the distance setting means so as to obtain proper exposure in the flash photography regardless of the setting of the distance and resistor means selectively connected to the terminals of the galvanometer for adjusting the guide number of the flash device, the variation in the shutter speed effected by the automatic exposure control device does not affect to the proper exposure when X-contacts are used together with an electronic flash device because the X-contacts are closed at the time the shutter blades are fully opened. To the contrary, when M-contacts are used together with a flash bulb device, the light quantity available by the flash bulb can not be effectively utilized as the shutter speed is made higher by the automatic exposure control device thereby resulting in an underexposure because the shutter blades are closed before the peak of light quantity of the flash bulb is obtained, thus requiring the variation in the guide number or the shutter speed so as to obtain a proper exposure.

SUMMARY OF THE INVENTION

An object of the present invention is to provide a novel and useful photographic camera having a flash synchronizing device wherein the flash synchronizing device is automatically switched to X-contacts by mounting an electronic flash device on the camera, while, when a flash bulb device is attached to the camera, the flash synchronizing device is automatically switched to M-contacts so that proper operation of the flash device is achieved without requiring manual manipulation of the flash synchronizing device.

Another object is to provide a novel and useful flash bulb device for use with a photographic camera having a flash synchronizing device wherein the flash synchronizing device is automatically switched to M-contacts when a flash bulb is loaded in the flash bulb device mounted on the camera.

A further object of the present invention is to provide a novel and useful compensating device for the exposure light quantity in a photographic camera having an automatic exposure control device and a flash synchronizing device, wherein the exposure light quantity in a flash bulb photography is automatically compensated for so as to obtain proper exposure regardless of the variation in the shutter speed regulated by the automatic exposure control device.

In accordance with a feature of the present invention, the accessory shoe of the camera is provided with a first electric contact connected to X-contacts of the flash synchronizing device and a second electric contact connected to M-contacts, the first electric contact being located at a position corresponding to the mating contact of an electronic flash device to be mounted on the accessory shoe so that the flash synchronizing device is automatically switched to X-contacts when the electronic flash device is mounted, while the second electric contact is located at a position corresponding to the mating contact of a flash bulb device to be mounted on the accessory shoe so that the flash synchronizing device is automatically switched to M-contacts when the flash bulb device is mounted.

In accordance with another feature of the present invention, the flash bulb device is provided with a movable member which is normally held in a first position when no flash bulb is loaded in the flash bulb device but which is moved to a second position when a flash bulb is loaded in the flash bulb device so that, when the flash bulb device is mounted on the camera, the movable member abuts against a switching lever and moves it so as to switch the flash synchronizing device to M-contacts upon loading of a flash bulb.

In accordance with a further feature of the present invention, the flash synchronizing device coupled with the automatic exposure control device is provided with two sets of resistor means one of which is exclusively for X-contacts while the other is exclusively for M-contacts, either one of the two sets being selectively connected to the terminals of the galvanometer in the automatic exposure control device by a switch which is coupled with a switch for switching the synchronizing device from X-contacts to M-contacts or vice versa, so that, when the synchronizing device is switched to M-contacts, the resistor means for M-contacts is connected to the automatic exposure control device thereby permitting the underexposure which might be caused at a high shutter speed determined by the automatic exposure control device in the flash bulb photography to be positively prevented by virtue of the resistor means exclusively for M-contacts connected to the terminals of the galvanometer of the automatic exposure control device to compensate for the shutter speed for the proper exposure.

BRIEF DESCRIPTION OF THE DRAWINGS

FIGS. 10 and 11 are diagrams showing the relationship between the time and the aperture of the programming shutter controlled by the automatic exposure control device of the camera, respectively, FIG. 11 further showing the time for energizing the flash bulb so as to synchronize the peak of light of the flash bulb with the fully opened aperture controlled by the automatic exposure control device;

DETAILED DESCRIPTION OF THE PREFERRED EMBODIMENTS

Figure 1:
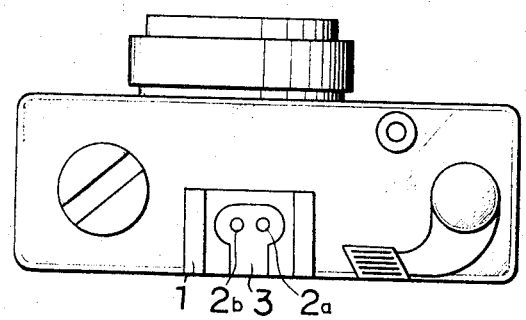
FIG. 1 is a plan view showing the photographic camera incorporating an embodiment of the present invention.
Figure 2:
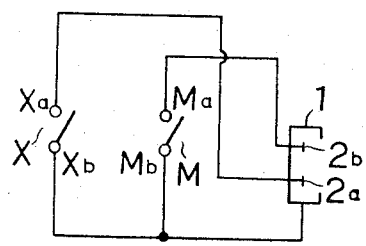
FIG. 2 is a diagram showing the electric circuit of the embodiment shown in FIG. 1.
Figure 3:
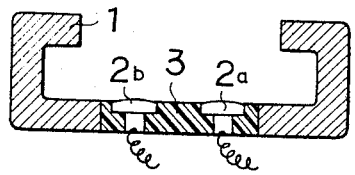
FIG. 3 is a sectional view of the accessory shoe shown in FIG. 1.

Referring to FIG. 1, an accessory shoe 1 is fixedly secured to the top surface of the camera housing. The accessory shoe 1 has in its intermediate portion an electrically insulating member 3 secured thereto as shown in FIGS. 2 and 3, in which a pair of terminals 2a and 2b are embedded. The terminals 2a and 2b are located at fixed positions transversely shifted from each other with respect to the direction of movement of a flash device for mounting the same on the accessory shoe 1 as shown in FIGS. 2 and 3.

The terminal 2a is connected to a contact Xa of X-contacts X for an electronic flash device in the flash synchronizing device of the camera while the terminal 2b is connected to a contact Ma of M-contacts M for a flash bulb device as shown in FIG. 2. The other contact Xb of the X-contacts X and the other contact Mb of the M-contacts M are connected to the main body of the camera and earthed.

Figure 4:
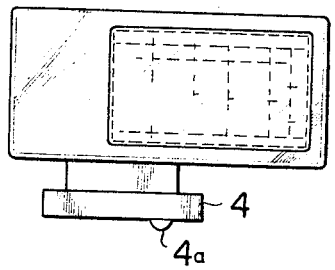
FIG. 4 is a front view showing an embodiment of the electronic flash device of the present invention used with the camera shown in FIG. 1.

FIG. 4 shows an electronic flash device for use with the camera shown in FIG. 1. The electronic flash device of FIG. 4 is provided with a mounting foot 4 adapted to slidably engage with the accessory shoe 1 for mounting the flash device on the camera. One terminal 4a of the flash device is located in the foot 4 at a position corresponding to the terminal 2a of the accessory shoe 1 so that the terminals 2a and 4a contact with each other when the flash device of FIG. 4 is mounted on the accessory shoe 1 while the other terminal of the flash is earthed to the body of the flash device and, therefore, connected to the main body of the camera so that the electric circuit of the electronic flash device is connected to the flash synchronizing device in the camera so as to be ready for X-contact synchronization flash photography.

Figure 5:
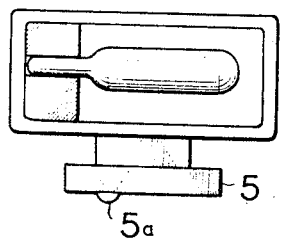
FIG. 5 is a front view showing an embodiment of the flash bulb device of the present invention used with the camera of FIG. 1.

FIG. 5 shows a flash bulb device for use with the camera of FIG. 1. As shown, the foot 5 of the flash bulb device is provided with a terminal 5a of the electric circuit thereof. The position of the terminal 5a is so set that the terminal 5a contacts with the terminal 2b of the flash synchronizing device of the camera when the flash bulb device of FIG. 5 is mounted on the accessory shoe 1, while the other terminal of the electric circuit of the flash bulb device is earthed to the main body of the flash device. Therefore, when the flash bulb device of FIG. 5 is mounted on the accessory shoe 1, the electric circuit of the flash bulb device is connected to the flash synchronizing device of the camera so as to be ready for M-contact synchronization flash photography.

Thus, either of the X-contacts or the M-contacts are automatically connected to the flash synchronizing device of the camera in accordance with the type of the flash device mounted on the camera for the proper flash synchronization.

Figure 6:
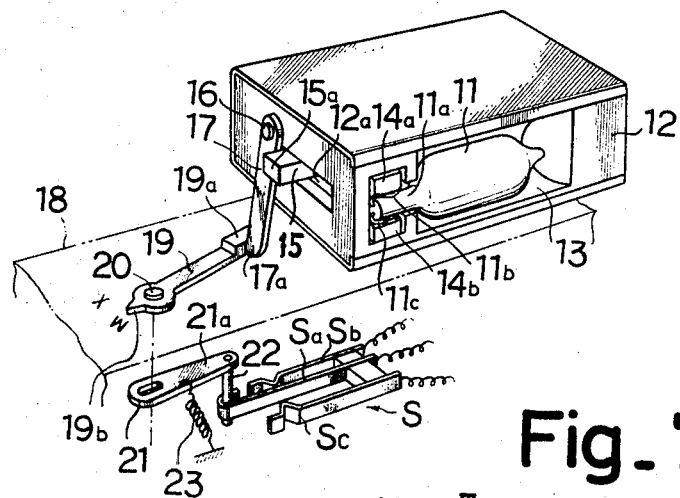
FIG. 6 is a perspective view showing another embodiment of the flash bulb device of the present invention having a movable member for actuating the switching lever of the flash synchronizing device in a photographic camera to switch the flash synchronizing device to M-contacts upon loading of a flash bulb in the flash bulb device mounted on the camera.
Figure 7:
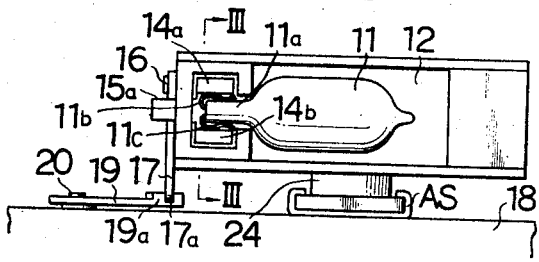
FIG. 7 is a front view showing the flash bulb device of FIG. 6.
Figure 8:
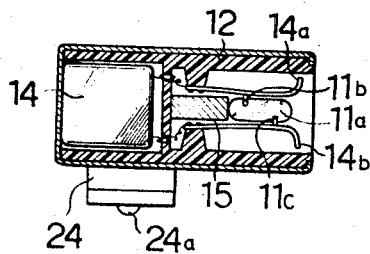
FIG. 8 is a sectional view showing the position of the movable member of the flash bulb device of FIG. 6 when a flash bulb is loaded therein.

FIGS. 6 – 8 show a flash bulb device of the present invention by which the M-contacts of the flash synchronizing device of the camera used therewith are automatically brought to operative position each time a flash bulb is loaded in the flash bulb device.

In this flash bulb device, a so-called peanut type flash bulb 11 is used which must be changed for new one each time it is used up.

As is well known, the flash bulb 11 is energized to emit flash light by means of an electric circuit including an electric source (at least a battery) and a capacitor and the flash bulb device of FIG. 6 incorporates such an electric circuit.

As shown in FIG. 6 the flash bulb device comprises a main body 12 housing therein a battery 14 as shown in FIG. 8 and having a recessed portion intermediate the front side wall thereof. A reflecting mirror 13 for reflecting the light from the bulb 11 is located in the recessed portion. A pair of leaf springs 14a, 14b are located at the left side portion of the front side wall of the body 12. The leaf springs 14a, 14b are urged toward each other so that the flattened base 11a of the flash bulb 11 is releasably clamped between the leaf springs 14a, 14b for holding the bulb 11 in the recessed portion in position. The leaf springs 14a, 14b also serve as contacts for connecting the bulb 11 to the electric circuit of the flash bulb device. To this end, lead wires or terminals 11b, 11c of the bulb 11 are located at the respective side surfaces of the base 11a of the bulb 11 so that, when the base 11a is clamped between the leaf springs 14a, 14b the lead wires 11b, 11c contact with the leaf springs 14a, 14b, respectively.

A movable member 15 which is electrically nonconductive is located between the leaf springs 14a, 14b. The movable member 15 may be urged toward the front side of the flash bulb device by means not shown, if necessary. The movable member 15 may be guided by guide means (not shown) for translational movement in the direction forwardly and backwardly of the flash bulb device between the leaf springs 14a, 14b, or may be pivoted in the flash bulb device so as to be swung forwardly and backwardly of the flash bulb device. The free end 15a of the movable member 15 extends from the main body 12 through an elongated hole 12a formed at the left side wall of the body 12 so as to be slidably guided thereby. Thus, when a flash bulb 11 is loaded in the flash bulb device, the movable member 15 is urged toward the rear side of the flash bulb device by the base 11a of the bulb 11 as shown in FIGS. 6 and 8. A swingable lever 17 is pivotally mounted on the left side wall of the flash bulb device by a pivot shaft 16 so that the lever 17 is urged in the clockwise direction by the movable member 15 when the same is moved rearwardly of the flash bulb device upon loading of a flash bulb 11 therein.

The camera used with the flash bulb device of FIG. 6 is provided with a switching lever 19 swingably mounted by a shaft 20 on the top surface of the body 18 of the camera. The base end of the lever 19 is secured to the upper end of the shaft 20 which is rotatably mounted in the body 18, while the free end 19a of the lever 19 is located in the path of movement of the lever 17 when the flash bulb device is mounted on the camera so that the lever 19 is rotated in the anticlockwise direction when the lever 17 is rotated in the clockwise direction. The base end of a lever 21 is fixedly secured to the lower end of the shaft 20 so that the lever 21 is rotated together with the switching lever 19. The lever 21 is normally urged in the clockwise direction by a spring 23 secured at its one end to the lever 21 while the other end is secured to a stationary portion in the camera. A pin 22 made of an insulating material is secured to the free end 21a of the lever 21. The free end of a movable contact Sa of a switch S is engaged with the pin 22. The switch S is provided with a pair of stationary contacts Sb and Sc arranged at the opposite sides of the movable contact Sa, respectively, so that either of the contacts Sb, Sc contacts with the contact Sa depending upon the direction of movement of the pin 22.

Figure 9:
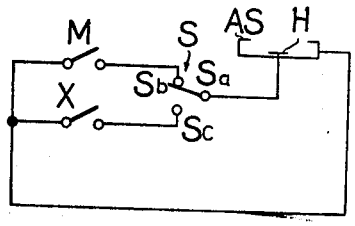
FIG. 9 is a diagram showing the electric circuit of the flash synchronizing device in the camera used with the flash bulb device of FIG. 6.

As shown in FIG. 9, the movable contact Sa of the switch S is connected to an electric contact or terminal H provided in an accessory shoe AS and electrically insulated from the body of the shoe AS while the contact Sb is connected to the body of the accessory shoe HS of the camera through M-contacts M and the contact Sc is connected to the body of the accessory shoe HS through X-contacts X.

One terminal 24a of the electric circuit of the flash bulb device is located in the foot 24 of the flash bulb device and insulated therefrom as shown in FIG. 8 so that the terminal 24a contacts with the terminal H of the accessory shoe AS when the flash bulb device is mounted on the shoe AS while the other terminal of the electric circuit of the flash bulb device is connected to the foot 24 so that the electric circuit of the flash bulb device is connected automatically to the flash synchronizing device of the camera by mounting the flash bulb device on the accessory shoe AS.

In operation, the flash bulb device of FIG. 6 is first mounted on the accessory shoe AS of the camera so as to connect the electric circuit of the flash bulb device to the flash synchronizing device of the camera. When a flash bulb 11 is loaded in the flash bulb device, the movable member 15 is moved rearwardly of the flash device so that the lever 17 is swung in the anticlockwise direction. Thus the lever 19 is swung in the anticlockwise direction together with the lever 21 against the action of the spring 23 thereby moving the movable contact Sa to contact with the contact Sb which are connected to the M-contacts M. The force of the spring 23 is selected to be relatively weak so that the movable member 15 will not be moved forwardly to eject the flash bulb 11 by the force of the spring 23. Therefore, when the flash bulb 11 is loaded, the flash synchronizing device is automatically switched to the M-contacts M for proper flash synchronization.

On the other hand, when an electronic flash device having no member engageable with the lever 19 is mounted on the shoe AS, the movable contact Sa is kept in contact with the contact Sc by virtue of the spring 23 so that the X-contacts X are connected in the flash synchronizing device thereby insuring the proper synchronization of the electronic flash device.

In order to indicate which of the X-contacts or M-contacts are connected to the flash synchronizing device, a pointer 19b is formed in the lever 19 which cooperates with marks X, M provided in the top surface of the camera, so that, when the lever 19 is moved in the anticlockwise direction by the loading of a flash bulb 11 in the flash bulb device mounted on the accessory shoe AS so as to switch the flash synchronizing device to the M-contacts M, the pointer 19b coincides with the mark M to indicate the connection of the M-contacts M, while the pointer 19b coincides with the mark X to indicate that the flash synchronizing device is switched to the X-contacts X when an electronic flash device is mounted on the accessory shoe AS of the camera.

FIGS. 10 and 11 show the characteristic curve of a programming shutter in which the aperture F formed by the shutter blades is indicated by the ordinate while the shutter time $t$ is indicated by the abscissa.

As shown, the aperture F increases along line A and, when the predetermined aperture determined by the automatic exposure control device of the camera is attained, the shutter blades are rapidly closed at the respective maximum aperture indicated by $a$, $b$, $c$ — depending upon the brightness of the scene.

Therefore, when X-contacts are used, it suffices to close the X-contacts at the respective maximum aperture $a$, $b$, — or $e$ as shown in FIG. 10 so as to synchronize the flash device with the shutter regardless of the variation in the shutter speed.

On the other hand, when M-contacts are used, the M-contacts must be closed at the point $ta$, $tb$, — or $te$ in advance of the respective maximum aperture $a$, $b$, $c$ — or $e$ by the time T, because it will take a longer time to reach the peak of illumination of the flash bulb device after ignition in comparison with the flash device for X-contacts as shown in FIG. 11.

In this case, however, proper exposure will be obtained when the shutter speed is relatively low (the aperture $d$ or $e$), but, when the shutter speed is relatively high as in the case of the maximum aperture $a$ or $b$, the flash light can not be effectively utilized for the proper exposure, because the time required for opening and closing the shutter blades is made shorter as shown in FIG. 11 thereby requiring the change in the guide number.

Therefore, the guide number setting resistor in the circuit for the flash photography must be changed in the operation X-contact photography and M-contact photography.

Figure 12:
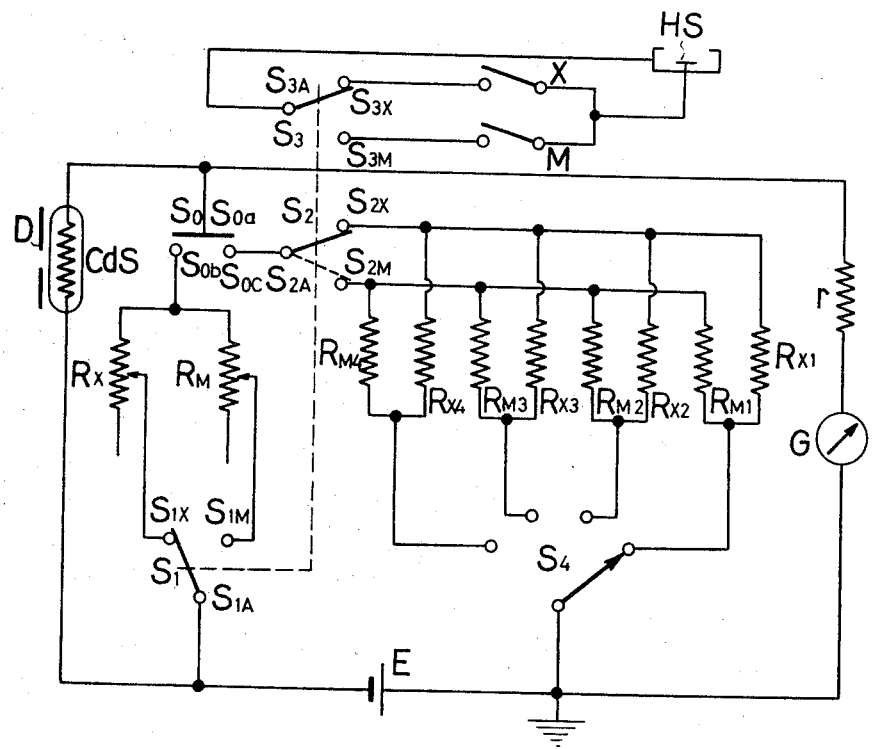
FIG. 12 is a diagram showing an embodiment of the electric circuit of the automatic exposure control device of the present invention which incorporates the compensating device for preventing underexposure in the flash bulb photography at a high shutter speed determined by the automatic exposure control device.

FIG. 12 shows the electric circuit of the present invention. In FIG. 12, a galvanometer G, a photoelectric element CdS and an electric source E connected in series as shown forms the automatic exposure control circuit A variable resistor $R_X$ for X-contact photography, the resistance of which varies in coupled relation to the operation of the distance adjusting ring of the camera, and a variable resistor $R_M$ for M-contact photography, the resistance of which varies in coupled relation to the distance adjusting ring such that the pointer of the galvanometer G is actuated in the direction to excessively increase the exposure by the flash light as the shutter speed is made higher, are connected in parallel to each other to the terminals of the photoelectric element CdS through a normally opened switch $S_o$ and a change-over switch $S_1$.

Figure 13:
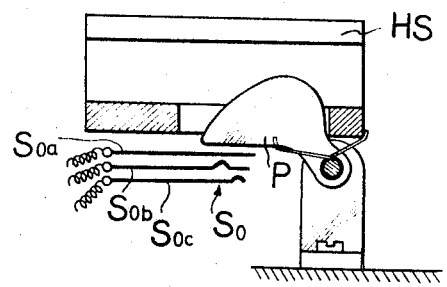
FIG. 13 is a sectional view showing the accessory shoe of the camera incorporating the automatic exposure control device of FIG. 12.

As shown in FIG. 13, the normally opened switch $S_o$ consists of movable contacts $S_{oa}$, $S_{ob}$, $S_{oc}$, and they are located beneath the accessory shoe HS of the camera so that they are closed together by an actuating member P swingably located adjacent to the shoe HS when a flash device is attached to the accessory shoe HS.

The movable contact $S_{oa}$ of the switch $S_o$ is connected to one end of the photoelectric element CdS and the minus terminal of the galvanometer G, while the movable contact $S_{ob}$ is connected to one ends of the resistors $R_X$ and $R_M$ as shown in FIG. 12. The movable contact $S_{oc}$ of the switch $S_o$ is connected to the movable contact $S_{2A}$ of a change-over switch $S_2$. The switch $S_2$ is operated in coupled relation to a change-over switch $S_3$ for X and M-contacts as well as to the change-over switch $S_1$ so that the movable contact $S_{2A}$ is moved to contact with the stationary contact $S_{2X}$ when the movable contact $S_{1A}$ of the switch $S_1$ contacts with the stationary contact $S_{1X}$ and the movable contact $S_{3A}$ of the switch $S_3$ contacts with the stationary contact $S_{3X}$ simultaneously with the operation of the switch $S_1$. Likewise, the movable contact $S_{2A}$ contacts with the stationary contact $S_{2M}$ simultaneously with the switching of the movable contact $S_{1A}$ to the stationary contact $S_{1M}$ and the movable contact $S_{3A}$ to the stationary contact $S_{3M}$. Further, the movable contacts of the coupled switches $S_1$, $S_2$ and $S_3$ are switched to the respective stationary contacts $S_{1X}$, $S_{2X}$ and $S_{3X}$ when a flash device of X-contact type is used, while they are switched to the respective stationary contacts $S_{1M}$, $S_{2M}$ and $S_{3M}$ when a flash device of M-contact type is used.

Guide number setting resistors $R_{X1}$, $R_{X2}$ — $R_{X4}$ for X-contact photography are connected in parallel to each other between the terminals of the galvanometer G through the stationary contact $S_{2X}$ of the switch $S_2$, the switch $S_o$ and a rotary switch $S_4$ as shown in FIG. 12. In like manner, guide number setting resistors $R_{M1}$, $R_{M2}$, — $R_{M4}$ for M-contact photography are connected in parallel to each other between the terminals of the galvanometer G through the stationary contact $S_{2M}$ of the switch $S_2$, the switch $S_o$ and the rotary switch $S_4$.

The resistance of each of the resistors $R_{X1}$, $R_{X2}$ — is selected to be different from that of each of the resistors $R_{M1}$, $R_{M2}$ — for the reasons described previously so as to obtain proper exposure.

Thus, the indication of the galvanometer G is compensated for to obtain the proper exposure by switching the rotary switch correspondingly to the guide number of the flash device and switching the switch $S_2$ depending upon the type of the flash device.

X-contacts X are connected to the stationary contact $S_{3X}$ of the switch $S_3$ while M-contacts M are connected to the stationary contact $S_{3M}$ of the switch $S_3$. The X-contacts X and the M-contacts M are connected together to an electric contact provided in the accessory shoe HS while the movable contact $S_{3A}$ of the switch $S_3$ is earthed to the accessory shoe HS as shown in FIG. 12 so that, when a flash device is attached to the accessory shoe HS, the flash device is electrically connected to the X and M- contacts, either ones of the X and M-contacts being operative depending upon the switching of the switch $S_3$.

A compensating resistor r is connected in series to the galvanometer G, while an adjustable diaphragm D is located in front of the photo-electric element CdS for setting the sensitivity of the film loaded in the camera.

As described above, either one of the series of the guide number setting resistors $R_{M1}$, $R_{M2}$ — for M-contact photography and the guide number setting resistors $R_{X1}$, $R_{X2}$ — for the X-contact photography is selective connected in the flash synchronizing circuit by means of the change-over switch $S_2$ which is coupled with the switch $S_3$ for the switching of the X-contacts X and the M-contacts M, so that the galvanometer G is automatically compensated for to achieve the proper exposure.

I claim:

1. In a photographic camera including a housing, a flash synchronizing apparatus in said housing and having an M-contact for cooperation with a flash bulb device and an X-contact for cooperation with an electronic flash device, and an accessory shoe fixedly mounted on said housing and adapted for alternatively receiving said devices, the improvement in said accessory shoe which comprises:

a. two terminals exposed on said accessory shoe for respective contact with conductors in the mounting feet of said devices, said terminals being spaced from each other; and b. conducting means respectively and permanently connecting said terminals to said M-contact and to said X-contact.

2. In a camera as set forth in claim 1, an electrically insulating member secured to said shoe, said terminals being mounted on said insulating member and insulated thereby from each other.

3. In a camera as set forth in claim 2, said shoe consisting of electrically conductive material and being conductively connected to a contact of said flash synchronization device, said insulating member insulating said terminals from said shoe.

4. In a camera as set forth in claim 3, said accessory shoe including means for guiding sliding movement of said device into a position of contact with one of said terminals, said terminals being spaced from each other transversely of the direction of said movement.

* * * * *